United States Patent [19]
Holcomb

[11] 3,970,345
[45] July 20, 1976

[54] CYCLE SEAT WITH ACCESSORY-BEARING ATTACHMENTS

[76] Inventor: Stephen A. Holcomb, 1369 N. Los Robles, Pasadena, Calif. 91104

[22] Filed: July 11, 1975

[21] Appl. No.: 595,071

[52] U.S. Cl. ............................ 297/195; 224/30 R; 297/243; 297/DIG. 9
[51] Int. Cl.² .......................................... B62J 1/00
[58] Field of Search ........... 224/31, 5.1, 30 R, 39 R, 224/32 R, 32 A; 135/16; 297/DIG. 9, 195, 243; 280/202, 353, 383

[56] References Cited
UNITED STATES PATENTS

| | | | |
|---|---|---|---|
| 2,536,570 | 1/1951 | Rehn | 224/32 R |
| 3,076,679 | 2/1963 | Lorber | 297/191 X |
| 3,148,851 | 9/1964 | Condon | 135/16 X |
| 3,572,561 | 3/1971 | McCauley | 224/32 A |
| 3,786,972 | 1/1974 | Alley | 224/31 |
| 3,822,917 | 7/1974 | George | 297/DIG. 9 |
| 3,850,353 | 11/1974 | Foulds | 224/31 |

*Primary Examiner*—James T. McCall
*Attorney, Agent, or Firm*—Wm. Jacquet Gribble

[57] ABSTRACT

A seat with integral backrest attaches to a conventional cycle seat frame such that the seat adjusts forward and back on the frame. The frame attaches normally to the conventional cycle seat post. The backrest of the seat is peripherally configured and perforated to receive straps and anchor bands of accessories such as backpacks, bulk containers and sunshades. Horizontal racks on the underside of the seat movably anchor the seat frame to the cycle and afford attachment means for accessory platforms for either cargo or persons. Either is additionally supported from the back of the cycle frame above the rear wheel thereof. The front seat portion has a coupler securing the seat to the cycle frame bar to set the attitude of the seat and to stabilize the seat against transverse motion.

11 Claims, 9 Drawing Figures

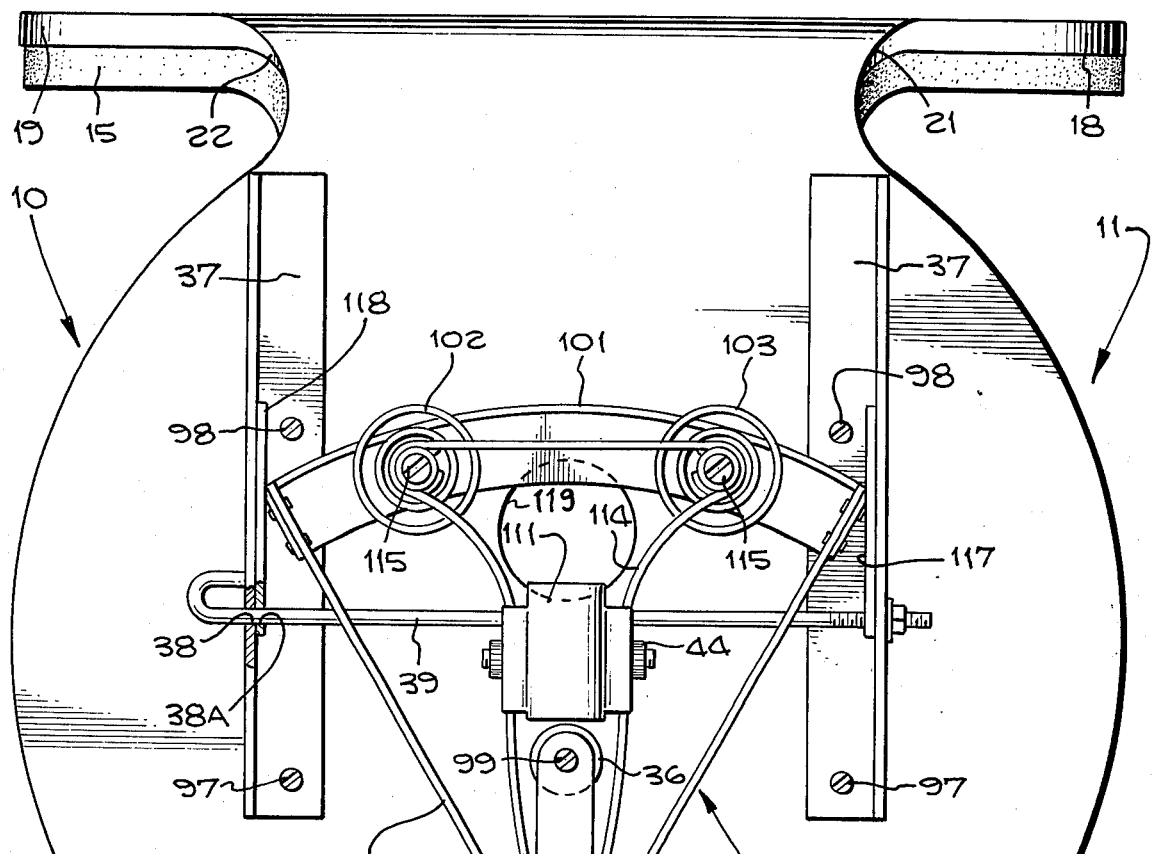
Fig. 7.
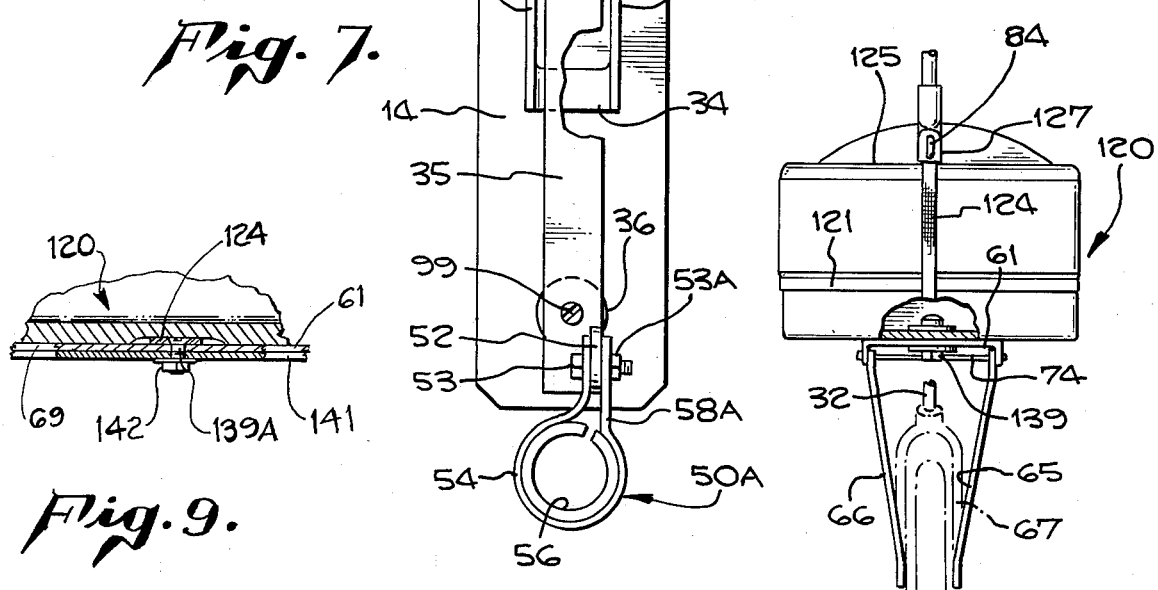
Fig. 9.
Fig. 8.

CYCLE SEAT WITH ACCESSORY-BEARING ATTACHMENTS

BACKGROUND OF THE INVENTION

The invention relates to adjustable seats for cycles, with both horizontal and vertical supports, which have means for bearing various accessories such as backpacks, baby carriers and bulk containers. The seat of the invention uniquely combines means for adjusting seat position for the rider longitudinally and means for carrying accessory equipment. The vertical backrest of the seat not only affords comfort for the user of any cycle but also affords a thrust surface for the bicycle rider to deliver power more efficiently to the pedals. The vertical backrest also affords means for securing various loads to the seat without interfering with the front-to-rear adjustability of the seat for the rider's comfort. It is therefore an object of the invention to provide a seat, for cycles that have both seat frame and frame post, that has both seat and backrest portions with the backrest portion supporting the rider and various accessories. A further object of the invention is to provide such a seat which is adjustable longitudinally of the cycle without interfering with the attachment of accessories.

BRIEF STATEMENT OF THE INVENTION

The invention contemplates, in a cycle having a conventional seat post and cycle seat frame, the combination comprising a seat base with a backrest at an angle to the base, and a horizontal retainer strip on the base adapted to be movably restrained on the conventional front yoke of the cycle seat frame. A slide bar attached to each side of the seat frame at the rear frame member affords a track for transversely spaced longitudinal racks on the seat base. A removable lock rod adapted to extend through the racks and the slide bars secures the racks and therefore the seat adjustably with respect to the slide bars on the seat frame for seat adjustment longitudinally of the cycle. Securing means at the front of the seat couples the seat to the cycle frame bar and means are provided on the seat back or on the longitudinal racks for securing a load to the seat.

In a preferred embodiment the backrest of the seat is peripherally shaped to support horizontal straps or the yokes of cargo bags, such as newspaper carriers or hiking packs. Additionally, horizontal platforms attached to the seat and further supported from the rear wheel fork may bear other accessories, which may also be secured to the backrest.

The invention thus provides a seat that is adaptable to either powered or pedalled cycles which improves the efficiency of pedalled operation, easily adapts to bearing loads of various types and is adjustable for rider comfort with respect to footrests and pedals. These and other advantages of the invention are apparent from the following detailed description and the drawing.

BRIEF DESCRIPTION OF THE DRAWING

FIG. 7 is a bottom plan view of a seat in accordance with the invention detached from the cycle seat post; and FIGS. 8 and 9 are fragmentary rear elevations, partly in section, of alternate embodiments of the invention including a bulk carrier such as an ice chest.

DESCRIPTION OF THE PREFERRED EMBODIMENTS

In the various Figures like parts are given like numerals.

Figure 1:
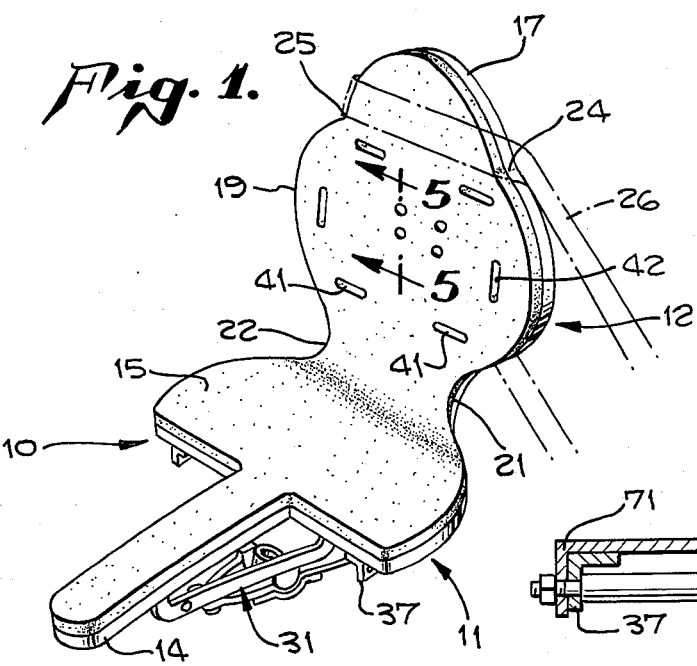
FIG. 1 is a perspective view of a padded seat in accordance with the invention, detached from the cycle seat post.

In FIG. 1 a seat 10 in accordance with the invention has a seat base 11 and a seat backrest 12. A tongue 14 extends the seat base forwardly and is preferably integrally formed with the backrest. A resilient pad 15 configured to match the seat and backrest surfaces covers both. The backrest periphery is tri-lobal, there being a top arcuate lobe 17, side lobes 18 and 19 and indentations 21 and 22 at the juncture of the seat base and the backrest. In one form of the invention the base and backrest are steam-formed plywood, although the invention does not preclude a molded seat base and backrest of high impact plastic or other moldable material.

Forward tongue 14 reduces the forward width of the seat base for free leg motion of the rider whether the seat be on a bicycle or on a motorcycle.

As can be seen in FIG. 1, the intersections 24, 25 of the arcuate lobes of the backrest define shelves which are engaged by a load carrying strap 26. The strap is representative, and may be a backpack strap or a newspaper bag yoke, or a strap of other like load carriers, each hangable so its weight restricts the strap or yoke about the backrest.

Figure 2:
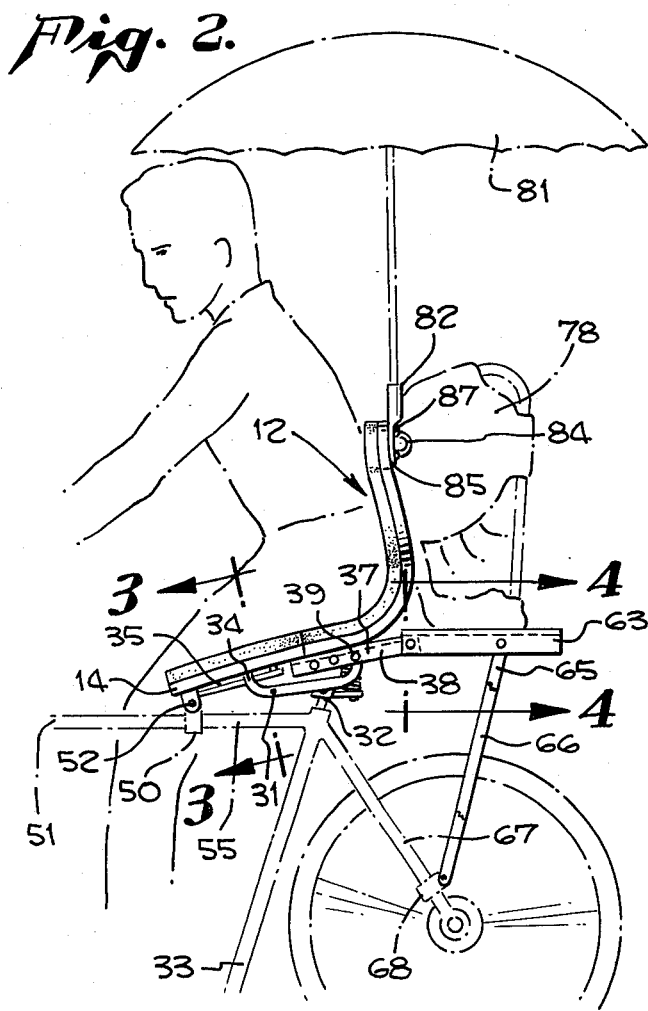
FIG. 2 is a fragmentary side elevation of the seat of FIG. 1 on a bicycle and combined with a load-bearing platform.

In FIGS. 1 and 2 the seat base 11 is secured to a conventional seat frame 31 anchored to a seat post 32 of a schematically shown bicycle 33. The conventional seat frame has a front yoke 34 which restrains a longitudinal horizontal strip 35 of the cycle seat. The strip is spaced from the bottom of the seat base by washers 36. A pair of spaced longitudinal racks like the rack 37 of FIG. 2 each have a plurality of aligned holes 38 arrayed horizontally. A lock rod 39 secures the racks and the seat to the cycle seat frame in a manner described in more detail with respect to FIG. 7.

Turning again to FIG. 1, it can be seen that a plurality of elongate slots 41 oriented horizontally, and a pair of elongate slots 42 oriented vertically penetrates the pad 15 and the adjacent backrest 12. In some instances it is desirable to pass anchor straps of accessory parts through the slots 41, 42 in order to secure them to seat 10. Slots other than those shown may be combined with the back rest to accomplish the purpose.

Figure 3:
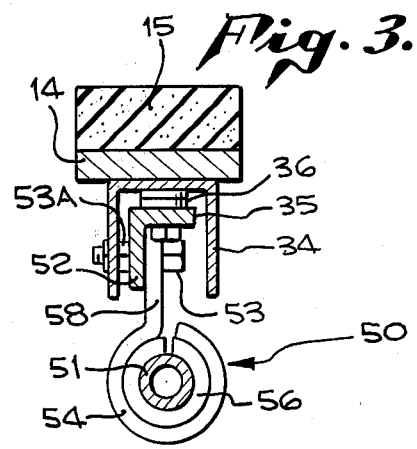
FIG. 3 is a sectional elevation taken along line 3 — 3 of FIG. 2.
Figure 4:
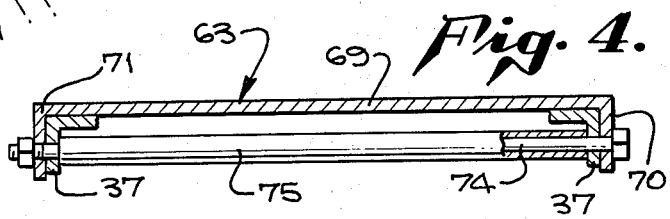
FIG. 4 is a fragmentary sectional elevation taken along line 4 — 4 of FIG. 2.

It has been found that a slightly downwardly sloping seat base with a nearly vertical backrest is conducive to comfort and to efficient delivery of power to the pedals when the seat is on a bicycle. While some slope adjustment is possible through the conventional lock joint 44 (FIG. 7) of the seat frame, the preferred embodiment of the invention affords a lock collar or coupler 50 shown in FIG. 3 to secure the front of the seat base to a cycle frame bar 51. The horizontal restraint strip 35 has a depending ear 52 through which a bolt 53 with a nut 53A is placed. The loop 54 of the coupler wraps about the frame bar 51 (see FIG. 2) with a split grommet 56 of resilient material between the bar 51 and the loop 54. A stem 58 of the coupler is trimmed to fit after installation of the seat frame. The seat is thus held against transverse wobble as well as being fixed in slope attitude.

Figure 6:
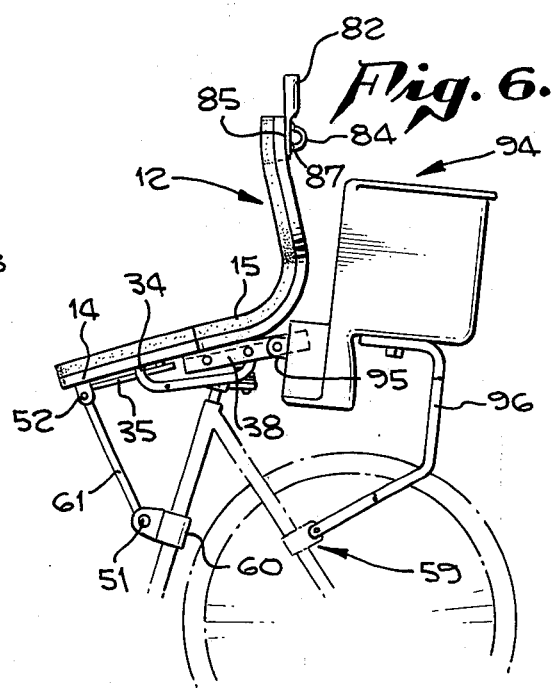
FIG. 6 is a fragmentary side elevation of a seat similar to the seat of FIG. 1 combined with a child carrier on a girl's bicycle.

The preceding describes the securing coupler for combination with a boy's bicycle. In FIG. 6 a girl's cycle 59 has no horizontal bar 51. Therefore, a lock collar 60 fixed to the seat frame tube above the pedal journal (not shown) locks one end of a turnbuckle 61 which extends between the lock collar and the ear 52 of restraint strip 35. The pitch of seat 10 may thereby be adjusted by manipulation of the turnbuckle.

If the load to be borne by the seat would be unstable when secured only to the seat backrest, the seat may be combined with a rearwardly extending platform 63 (FIG. 2) that is attached to the longitudinal racks 37 of seat 10 and supported rearwardly by parallel, downwardly depending limbs 65, 66 linked in conventional fashion to rear wheel fork members 67 by clamps 68. Platform 63 affords a support surface 69 rigidified by depending sides 70, 71 that are spaced apart the span of the racks 37 of the seat 10. An elongate bolt 74 passes through both of the platform sides and through the racks and a tubular spacer 75 that maintains the transverse spacing of the racks and of the transversely spaced platform sides 70, 71.

In FIG. 2 a backpack 78 rests upon platform 63 while restrained erect by its straps like strap 26 of FIG. 1 passing about the backrest at the lobe intersections 24, 25, or threaded through the slots 42. Other loads, like the sunshade or umbrella 81, or other shafted articles, may be accommodated in an upright socket 82 at the top rear of the backrest. Preferably the socket, which may be a conventional flag standard, is secured to the backrest by a U-bolt 84 passing through the socket flange 85 and the backrest and fixed by pairs of nuts 87 on both sides of the backrest. The U-bolt defines a hasp catch whereby various loads may be locked to the seat.

Figure 5:
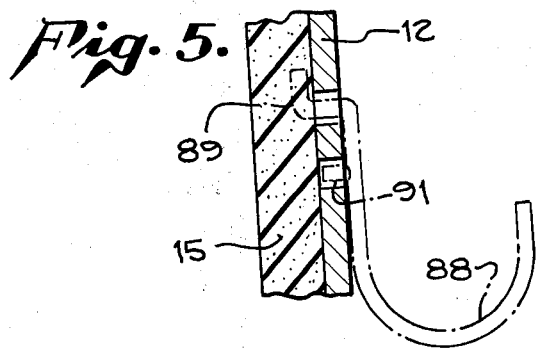
FIG. 5 is a fragmentary sectional elevation taken along line 5 — 5 of FIG. 1.

FIG. 5 shows a pegboard hook 88 with a prong 89 and a pin 91 engaged in holes 92, 93 respectively, of the backrest. By vertically pairing properly spaced holes in the backrest, hooks may be placed as desired to accept different loads at different back locations. The pad 15 covers any protrusion of the hook through the back as it covers the projection of the U-bolt 84 of FIG. 2 through the backrest 12.

The seat of the invention also combines with conventional carriers like the child carrier 94 of FIG. 6, since it is usual for such carriers to have spaced perforated strips like strip 95 projecting forwardly of the carrier seat. Simple conventional attachment of the carrier limbs 96 to the rear wheel frame, with bolt and nut linkage of the carrier strips 95 and seat racks 37, secures the conventional carrier to the cycle 59 equipped with the seat of the invention.

The bottom of the seat 10 of FIG. 1 is shown in FIG. 7 to a larger scale, with the racks 37 fastened to the seat bottom by threaded fasteners 97, 98 and the restraint strip 35 held to the seat and seat base tongue by fasteners 99 passing through spacers 36 at each end of the strip. As can be seen from FIG. 7, the cycle seat frame 31 is conventional, but stripped of its seat outer shell and padding. A rear frame arc 101 retains seat springs 102, 103 and joins diverging radial side frame members 105, 106. The forward parallel side member portions 108, 109 of the frame terminate in the previously described frame yoke 34 located between the seat bottom and restraint strip 35. A compression collar 111 of conventional design for attachment to the cycle seat post 32 supports spaced seat spring wires 114 which are fixed at one end near the front yoke and at the other end to spring posts 115, all in conventional fashion.

In accordance with the invention slide bars 118, 119 are fixed as by welding to the cycle seat frame near the juncture of the frame arc 101 and the side members 105, 106. The slide bars are perforated, as are the racks, to accept the previously described lock rod 39 to hold the longitudinal position of the seat racks with respect to the cycle seat frame 31. The lock rod is removable so the seat may be moved back and forth and the rod replaced through different holes 38 of the racks and 38A of the slide bars. Each adjustment forward or backward of the seat on the seat frame requires replacement of the lock rod and loosening and re-tightening of coupler 50A. The coupler is shown in FIG. 7 revolved from normal position at the cycle frame bar 51 into the plane of the seat base for better showing of coupler detail, with the loop 54, stem 58A and grommet 56 being shown.

The entire seat of the invention is adjustable along the cycle frame and additionally may be set to a selected attitude by controlling the length of lock stem 58A in the embodiment of FIG. 2, or by adjusting turnbuckle 61 of the embodiment of FIG. 6. The seat may be chained to the frame by a conventional chain (not shown) passing through aperture 119 in seat and pad. Various loads may be attached to the seat by the combination of elements provided. For instance, FIG. 8 illustrates a bulk carrier such as an ice chest 120 secured to the added platform 61 of FIG. 2. The chest has a horizontal strap 121 about which is secured through the slots 42 of the backrest previously described. A second bisecting strap or metallic belt 124 passes about the chest and the chest cover 125 and terminates in a hasp 127 secured to the U-bolt 84 of FIG. 2, preferably by a padlock (not shown). A clip may be substituted for the padlock for easier access to hold the chest removably on the platform. Additional security may be obtained by a central bolt 139 passing from the interior of the chest through the platform surface 69, strap 124 and a nut. Alternatively a stove bolt may pass upwardly through the platform, strap and chest to an internal nut so the bolt may not be manipulated except from within the chest, whose cover 125 is held by strap 124 and hasp 127 on the bolt 84.

FIG. 9 illustrates a further alternative security arrangement whereby a bolt head recessed between the strap 124 and the bottom of the chest restrains the chest since the bolt shank passes through the strap 124, platform 61, a support stringer 141 and a conventional nut 142. Since the strap is locked to the hasp the projecting bolt cannot be dislodged from the platform even if the nut is removed.

It can be appreciated that other load-bearing attachments than those shown herein to illustrate the invention may be accommodated by the unique combination of elements comprising the inventive structure. While the cycle seat of the invention is effective in providing pedalling efficiency, it is equally effective in providing comfortable seating on any cycle in combination with versatile loadbearing capability. Many variations within the scope of the invention will occur to those skilled in this art in addition to the various embodiments disclosed herein. It is therefore desired that the invention be measured by the appended claims rather than by the illustrative disclosure herein.

I claim:

1. A rider's cycle seat for adjustable attachment to a conventional cycle seat frame having a front yoke and a rear frame member, and comprising a seat base, a backrest at an angle to the seat base, a horizontal retainer strip on the seat base adapted to movably retain the seat base with respect to the front yoke on the cycle seat frame, a slide bar attached at each side of the seat frame, transversely spaced longitudinal racks on the seat base, a removable lock bar adapted to extend through the racks and the slide bars so as to adjust the seat base and backrest longitudinally of the cycle, means for securing the front of the seat to the cycle frame, and means on the seat for securing a load to the seat other than the rider.

2. A cycle seat in accordance with claim 1 wherein the means for securing a load comprises slots for straps in the backrest.

3. A cycle seat in accordance with claim 1 wherein the means for securing a load to the seat comprises intersecting lobes on the seat backrest periphery, said intersections defining saddles for bearing load straps.

4. A cycle seat in accordance with claim 1 wherein the means for securing a load comprises spaced, horizontal perforate racks on the seat base, a horizontal platform, and spaced horizontal perforate strips on the platform edges or sides.

5. A cycle seat in accordance with claim 4 further comprising downwardly depending limbs on the platform secured to the cycle frame.

6. A cycle seat in accordance with claim 1 wherein the means for securing the front of the seat comprises a coupler having a loop adapted to encircle a frame bar, a stem extending from the loop to the restraining retainer strip, and means fixing the stem releasably to the retainer strip.

7. A cycle seat in accordance with claim 1 wherein the means for securing the front of the seat comprises a coupler having a coupler loop adapted to attach to the cycle frame, a turnbuckle secured at one end to the loop, and means securing the other end of the turnbuckle to said retainer strip.

8. A cycle seat in accordance with claim 1 further comprising a wide seat base portion, a narrow, forwardly extending base tongue, a curving transition portion between the seat base and the backrest, said backrest, tongue and seat base being integral, and a seat pad covering the seat base and the backrest, said pad being similar in peripheral configuration to the seat base and the backrest.

9. A cycle seat in accordance with claim 8 further comprising a plurality of pairs of apertures piercing the backrest.

10. A cycle seat in accordance with claim 9 wherein at least one pair of said plurality of pairs comprises vertically elongate slots, and at least one pair of said plurality of pairs comprises horizontally elongate slots.

11. A cycle seat in accordance with claim 9 wherein at least one pair of said plurality of aperture pairs comprises vertically spaced circular apertures.

* * * * *